C. H. SMOOT.
COMMUTATING DYNAMO ELECTRIC MACHINE.
APPLICATION FILED JAN. 6, 1914.
1,111,504.
Patented Sept. 22, 1914.
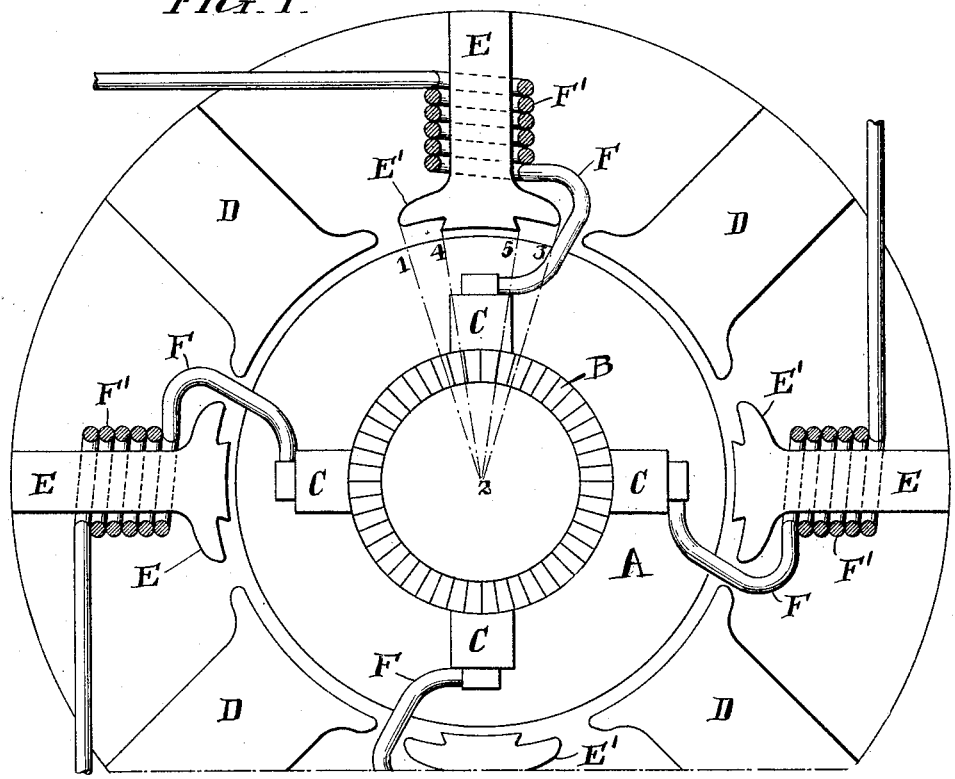
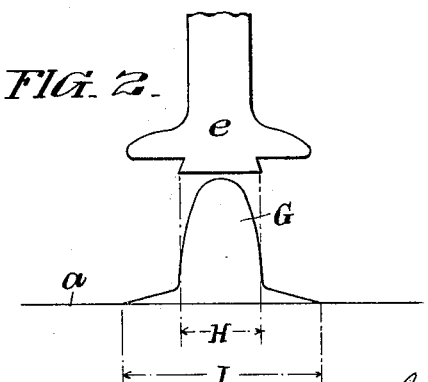

UNITED STATES PATENT OFFICE.

CHARLES HEAD SMOOT, OF NEW YORK, N. Y., ASSIGNOR TO RATEAU BATTU SMOOT COMPANY, OF NEW YORK, N. Y., A CORPORATION OF NEW YORK.

COMMUTATING DYNAMO-ELECTRIC MACHINE.

1,111,504.  Specification of Letters Patent.  Patented Sept. 22, 1914.

Application filed January 6, 1914. Serial No. 810,596.

*To all whom it may concern:*

Be it known that I, CHARLES HEAD SMOOT, a citizen of the United States of America, residing in the city, county, and State of New York, have invented certain new and useful Improvements in Commutating Dynamo-Electric Machines, of which the following is a true and exact description, reference being had to the accompanying drawings, which form a part thereof.

My present invention relates to commutating dynamo electric machines having commutating pole pieces, and the primary object of my invention is to provide a machine of this type with commutating poles of such construction as to insure satisfactory commutation with brushes spanning greater arcs of the commutator periphery, than has heretofore been possible, and which will permit of a material variation in the extent of the arcs of contact between the brushes and commutator without causing unsatisfactory commutation. The use of my invention, by increasing the proportion of the commutator surface which may be engaged by the brushes, makes it possible to decrease the size of commutator employed. This is a matter of considerable importance in the case of a modern high speed dynamo, wherein the commutator must be of small diameter to avoid destructive centrifugal effects, and with the narrow brushes required, it has heretofore been necessary to make the commutator undesirably long. The possibility, resulting from the use of my invention, of varying the extent of the arc of contact of the commutator and brushes without materially affecting the commutating conditions, is of considerable practical importance, for in service the effective width of the brushes is constantly varying, because of the crumbling of the edges of the brushes and the cutting or roughening of the edges of the commutating bars.

The various features of novelty which characterize my invention are pointed out with particularity in the claims annexed to and forming a part of this specification.

For a better understanding of the invention, however, and of the advantages possessed by it, reference should be had to the accompanying drawings and descriptive matter, in which I have illustrated and described one form in which my invention may be embodied.

Of the drawings: Figure 1 is a diagrammatic elevation of a portion of a dynamo embodying my invention; and Fig. 2 is a diagram, illustrating the magnetizing effect of such a commutating pole as is employed in Fig. 1.

In the drawings, A represents the armature, B the commutator, and C the brushes of a dynamo electric machine, having main poles D, and interposed commutating poles E. The commutating poles E are surrounded by the windings F' connected in series with the conductor F leading from one of the brushes C. The novel feature of the commutating poles E consists in the horns or projections E' formed on each commutating pole which project from the opposite sides of the pole toward the adjacent main poles D and, while adjacent the armature end of the commutating pole, are spaced away from the armature a distance appreciably greater than the distance between the face of the pole tip $E^2$ proper and the armature. These projections E' serve as magnetic shields, preventing the entrance into the portion of the armature surface subtended by the angle 1, 2, 3 of stray magnetism or leakage from the main poles D. At the same time the magnetizing effect of each commutating pole is practically all directed from the pole face $E^2$ of the pole. This is shown in Fig. 2, wherein $a$ represents the developed peripheral surface of the armature of such a machine as is shown in Fig. 1, $e$ represents a correspondingly developed or distorted commutating pole, and G is a curve representing the magnetizing effect on the armature of the commutating pole $e$. The length of a perpendicular to the surface $a$ from any point in the latter to the curve G represents the magnetizing force of the pole $e$ at that point. It is apparent that the bulk of the magnetic lines from each pole $e$ which enter the armature, enter the latter through the portion of its periphery corresponding to the developed arc H. It is apparent also that each commutating pole shields a portion of the armature surface corresponding to the developed arc I against the entrance therein of magnetic leakage from the main poles. The developed arcs H and I of Fig. 2 correspond approximately to the peripheral arcs of the armature subtended in Fig. 1 by the angles 4, 2, 5 and 1, 2, 3, respectively.

Without the horns or lateral projections from the commutating poles, each brush would have to contact with the commutator over a peripheral portion thereof which is subtended by an angle approximately equal to that subtending the arc H. If the brush then engaged the commutator over a smaller peripheral arc, the commutation would be bad, because less than the full magnetizing force of the commutating pole would be operative on the windings undergoing commutation. If the brush engaged the commutator over a larger arc, commutation would be bad, because of the leakage field then acting on the windings undergoing commutation. With the present invention, however, the brush may engage the commutator over a peripheral arc varying in length between the arc of the commutator corresponding to the armature arc H, and the commutator arc corresponding to the armature arc I, without materially affecting the character of the commutation, for if the brush is as wide as the minimum limit specified substantially all the magnetizing force of the commutating pole will be utilized in commutation; and if the brush is not wider than the maximum limit specified, there will be no appreciable disturbance in commutation from stray fields.

While in accordance with the provisions of the statutes I have illustrated and described the best form of my invention now known to me, it will be apparent to those skilled in the art that changes may be made in the form of the apparatus disclosed without departing from the spirit of my invention, and that under some conditions certain features of my invention may be used without a corresponding use of other features.

Having now described my invention, what I claim as new and desire to secure by Letters Patent, is:

1. In a commutating dynamo electric machine the combination with the armature and the main field poles, of interposed commutating poles, each comprising a magnetic core formed with a pole face at its armature end through which substantially all of the commutating flux of said pole passes, and with portions adjacent its armature end which project toward the adjacent main poles at a distance from the armature somewhat greater than the distance between the armature and the face of said pole and which form magnetic shields covering substantial portions of the armature at each side of the portion covered by the face of said pole.

2. A magnetic core for the commutating pole of a dynamo electric machine comprising a body portion with a pole face at one end and formed with horns at opposite sides projecting away from the body at some distance from the pole face and adapted to serve as magnetic shields to prevent leakage flux entering the armature with which said core coöperates at the sides of the armature portion covered by said pole face.

CHARLES HEAD SMOOT.

Witnesses:
L. BATTA,
ALFRED E. SMITH.

Copies of this patent may be obtained for five cents each, by addressing the "Commissioner of Patents, Washington, D. C."